United States Patent [19]

Nakashima

[11] Patent Number: 5,555,170
[45] Date of Patent: Sep. 10, 1996

[54] SYSTEM AND METHOD FOR CONTROLLING DOWN SHIFTING OF VEHICLE AUTOMATIC TRANSMISSION

[75] Inventor: Yasuhiro Nakashima, Kyoto, Japan

[73] Assignee: Mitsubishi Jidosha Kogyo Kabushiki Kaisha, Tokyo, Japan

[21] Appl. No.: 258,086

[22] Filed: Jun. 10, 1994

[30] Foreign Application Priority Data

Jun. 11, 1993 [JP] Japan .................................. 5-140466

[51] Int. Cl.$^6$ .................................................. B60K 41/06
[52] U.S. Cl. ...................... 364/424.1; 395/900; 477/120; 477/901; 477/904
[58] Field of Search .................. 364/424.1; 477/901, 477/904, 97, 120; 395/900

[56] References Cited

U.S. PATENT DOCUMENTS

| | | | |
|---|---|---|---|
| 5,101,350 | 3/1992 | Tokoro | 364/424.1 |
| 5,124,916 | 6/1992 | Tokoro et al. | 364/424.1 |
| 5,235,876 | 8/1993 | Minowa et al. | 364/424.1 X |
| 5,361,207 | 11/1994 | Hayafune | 364/424.1 |
| 5,389,050 | 2/1995 | Sakai et al. | 364/424.1 |
| 5,390,116 | 2/1995 | Hayafune | 364/424.1 |
| 5,428,531 | 6/1995 | Hayafune | 354/424.1 |

FOREIGN PATENT DOCUMENTS

| | | |
|---|---|---|
| 63-246546 | 10/1988 | Japan . |
| 1-269749 | 10/1989 | Japan . |
| 2-3738 | 1/1990 | Japan . |

*Primary Examiner*—Collin W. Park

[57] ABSTRACT

Shift control system and method are provided for use in a vehicle automatic transmission in which a desired speed range is achieved in accordance with the state of driving of a vehicle. The degree of meandering of a running road on which the vehicle is running is detected. The downhill grade of the running road is also detected. Based on the detection results, it is determined whether or not the running road is a meandering downhill road. When it is determined that the vehicle is running on the meandering downhill road, it is then determined whether or not a downshift is needed. When the downshift has been determined to be necessary, the speed range of the vehicle automatic transmission is shifted from a current speed range to a speed range lower than the current speed range.

26 Claims, 7 Drawing Sheets

FIG.3

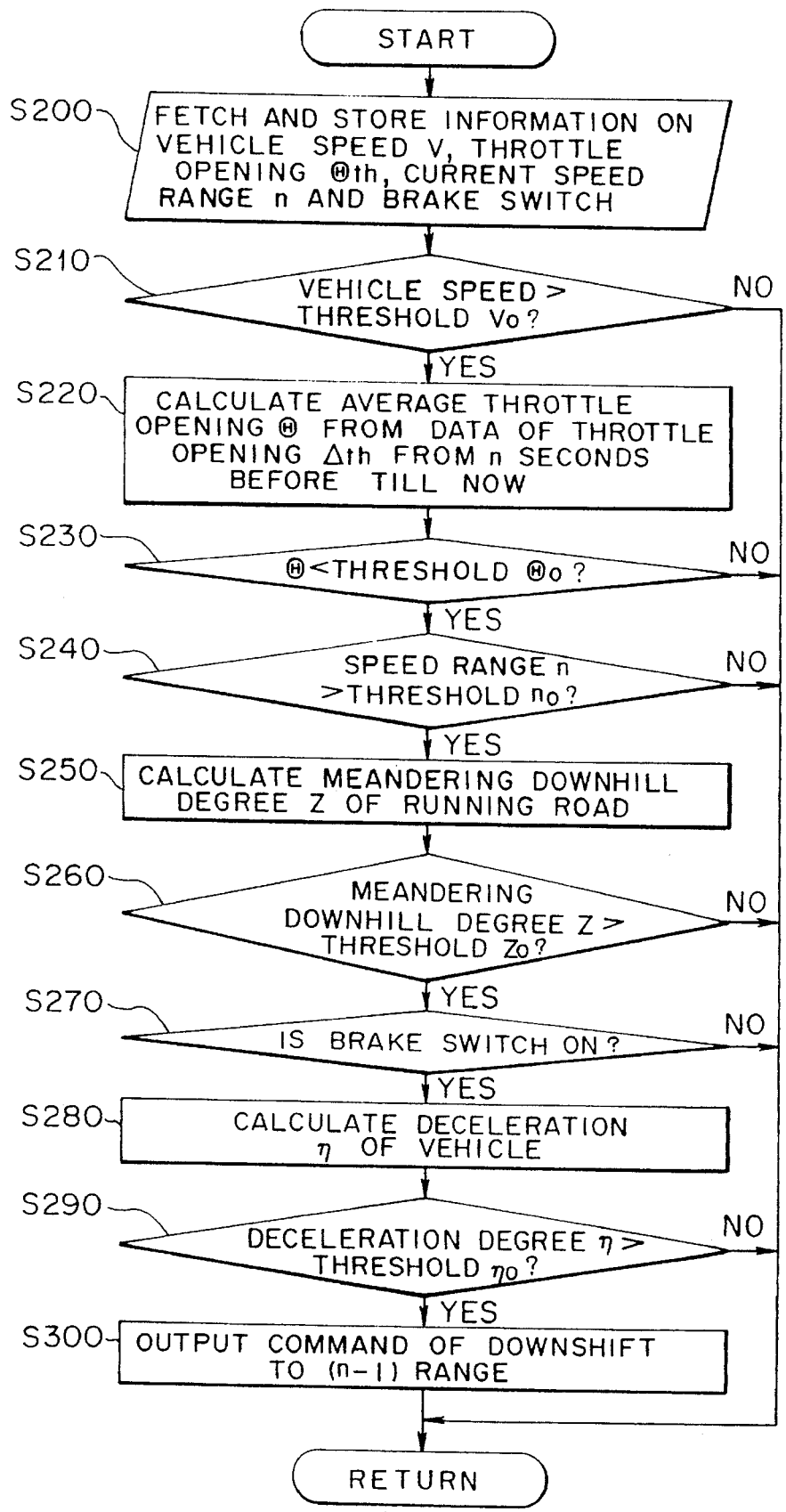

SYSTEM AND METHOD FOR CONTROLLING DOWN SHIFTING OF VEHICLE AUTOMATIC TRANSMISSION

BACKGROUND OF THE INVENTION a) Field of the Invention

This invention relates to a system and method for controlling shifting of a vehicle automatic transmission so that an engine brake can be applied to a vehicle especially when the vehicle is running on a meandering downhill road.

b) Description of the Related Art

A conventional vehicle automatic transmission suitable for use on an automotive vehicle is designed to perform a change-over in speed range such as an upshift or a downshift on the basis of a preset shift pattern upon receipt of information on an engine load such a throttle opening, information on a vehicle speed and information on a current speed range.

Under normal shift control, such a conventional vehicle automatic transmission involves no particular serious problem in shifting the speed range on a flat road as in street running, whereby the shifting is smooth and gives no sense of incongruity. When running, for example, in a mountainous region, however, there are straight uphill roads and also frequently bent uphill roads as well as steep downhill slopes and meandering downhill slopes requiring a strong engine brake, and gentle long downhill slopes. Appropriate smooth shifting is not always assured.

While running in such a mountainous region, it is rather difficult to choose a speed range optimal to the state of running of the vehicle, the driving behavior intended by the driver, road conditions and the like. There is accordingly a demand for permitting good control of motion of a vehicle by a simple running operation even during running in a mountainous region so that better drive feeling and run feeling can be obtained. On zig-zag downhill roads often found in mountainous regions, in particular, driving would be facilitated further if it would become possible to select such a speed range that applies an adequate engine brake.

For such a demand, it is known, for example, from Japanese Patent Application Laid-Open (Kokai) No. SHO 62-246546 or HEI 2-3738 to perform the so-called "fuzzy control" so that an optimal speed range corresponding to the above-described state of running of the vehicle can be selected.

These conventional shift control methods are designed to set optimal speed ranges by inferring all gear positions for running in both urban and mountainous regions in accordance with fuzzy inference. These conventional shift control methods making use of "fuzzy control" are however accompanied by the problem that they require many rules and hence a membership function of an intricate profile. This has led to the problems that a large-capacity computer is needed to put such a method into practical application and tuning of the control is difficult, thereby making it difficult to apply the control method to other types of automotive vehicles.

Further, additional incorporation of shift control by "fuzzy control" may result in the execution of shifting by such a small change in the running or driving state, e.g., running-over of a small bump or slight depression of an accelerator pedal that no shifting would take place according to the conventional art. This has led to the problem that the above shifting may give a sense of incongruity to drivers who are accustomed to running on flat roads such as street running under control by a conventional automatic transmission.

It is desired to surely determine each meandering downhill road and further to adequately apprehend the driver's demand for an engine brake on the meandering downhill road. Shift control by conventional "fuzzy control" has however not attained it to any satisfactory extent.

On such meandering downhill roads, driving would be made still easier if it would become feasible to achieve selection of such a speed range as permitting application of an adequate engine brake.

In general, it may be considered to determine the driver's demand for an engine brake on the basis of information on a braking operation by the driver. Proposals which relate to shift control and use information on a braking operation by a driver include, for example, those disclosed in Japanese Patent Applications Laid-Open (Kokai) Nos. HEI 2-3738 and HEI 1-269749. The former proposal uses information on a braking operation only for the prevention of a false judgment upon performing processing in a computer and is not relevant directly to shift control. The latter proposal determines the frequency of braking operations from information on the braking operations and then uses the frequency as a basis for the determination of whether the vehicle is running in a residential area or not. The frequency of braking operations, however, cannot be determined instantaneously from the driver's action and further, cannot be used directly for the determination of a meandering downhill road.

SUMMARY OF THE INVENTION

The present invention has been completed in view of the problems described above. An object of this invention is therefore to provide a shift control system and method for a vehicle automatic transmission, which make it possible to surely seize by simple control rules without addition of special sensors whether a road on which a vehicle is running is a meandering downhill road or not, so that an engine brake can be adequately applied while the vehicle is running on the meandering downhill road. Another object of this invention is to provide a shift control system and method for a vehicle automatic transmission, which make it possible to adequately apprehend the driver's demand for an engine brake upon running on the meandering downhill road so that an engine brake can be applied in accordance with the driver's intention.

To achieve the above objects, the present invention provides the following system and method for the control of shifting of a vehicle automatic transmission:

(A)

A shift control system for a vehicle automatic transmission in which a desired speed range is achieved in accordance with the state of driving of a vehicle, comprising:

means for detecting the degree of meandering of a running road on which said vehicle is running;

means for detecting the downhill grade of said running road;

means for determining whether or not said running road is a meandering downhill road, based on the results of detections by said meandering degree detection means and said downhill grade detection means;

means for determining, when said running road has been determined as the meandering downhill road by said meandering downhill road determining means, whether or not a downshift is needed; and means for shifting the speed range of said vehicle automatic transmission from a current speed range to a speed range lower than said current speed range when the downshift has been determined to be necessary by said downshift determining means.

The system (A) may include the following optional features:

(A-1)

In the system (A), by fuzzy inference making use of the degree of meandering and the downhill grade as input variables, said meandering downhill road determining means determines whether or not said running road is a meandering downhill road.

(A-2)

The system (A) further comprises:

means for detecting a load on an engine mounted on said vehicle; and means for detecting a differential acceleration, namely, a deviation of an acceleration of said vehicle;

wherein said downhill grade detection means detects the downhill grade on the basis of the engine load detected by said engine load detection means; and said meandering degree detection means detects the degree of meandering on the basis of the differential acceleration of said vehicle detected by said differential acceleration detecting means.

(A-3)

In the system (A) including the features (A-2), said meandering downhill road determining means determines whether or not said running road is a meandering downhill road, based on:

an average value of engine load obtained by averaging engine loads which have been detected by said engine load detection means during a first predetermined period preceding the determination by said meandering downhill road determining means; and a quantity of differential acceleration obtained by processing differential accelerations which have been detected by said differential acceleration detecting means during a second predetermined period preceding the determination by said meandering downhill road determining means.

(A-4)

In the system (A) including the features (A-3), said meandering downhill road determining means determines the running road as a meandering downhill road when the average value of engine load is small and the quantity of differential acceleration is large.

(A-5)

The system (A) further comprises:

means for detecting a deceleration of said vehicle;

wherein when said running road has been determined as the meandering downhill road by said meandering downhill road determining means, said downshift determining means determines whether or not a downshift is needed, on the basis of the results of a detection by said deceleration detecting means.

(A-6)

The system (A) including the features (A-5) further comprises:

means for detecting whether or not a braking operation has been made by a driver of said vehicle;

wherein said deceleration detecting means detects a deceleration of said vehicle upon detection of the braking operation by said braking operation detecting means; and when said running road has been determined as a meandering downhill road by said meandering downhill road determining means, said downshift determining means determines whether a downshift is needed or not, based on the deceleration during the braking operation detected by said deceleration detecting means.

(A-7)

In the system (A) including the features (A-5), said meandering downhill road determining means determines the degree of meandering downhill of said running road; and said downshift determining means determines whether a downshift is needed or not, by fuzzy inference making use of the degree of meandering downhill and the deceleration as input variables, said degree of meandering downhill and said deceleration having been determined by said meandering downhill road determining means and detected by said deceleration detecting means, respectively.

(A-8)

In the system (A) including the features (A-5), when the degree of meandering downhill determined by said meandering downhill road determining means and the deceleration detected by said deceleration detecting means are both large, said downshift determining means determines that a downshift is needed.

(A-9)

The system (A) including the features (A-5) further comprises:

means for detecting a load of an engine mounted on said vehicle;

wherein said downhill grade detection means detects a downhill grade on the basis of the engine load detected by said engine load detection means; and said downshift determining means determines whether or nor a downshift is needed, based on an average value of engine load obtained by averaging engine loads detected during a third predetermined period immediately before the determination by said downshift determining means.

(A-10)

In the system (A) including the features (A-9), when the degree of meandering downhill determined by said meandering downhill road determining means and the deceleration detected by said deceleration detecting means are both large and the average value of engine load is small, said downshift determining means determines that a downshift is needed.

(B)

A shift control method for a vehicle automatic transmission in which a desired speed range is achieved in accordance with the state of driving of a vehicle, which comprises the following steps:

detecting the degree of meandering of a running road on which said vehicle is running;

detecting the downhill grade of said running road;

determining whether or not said running road is a meandering downhill road, based on the results of detections in said meandering degree detection step and said downhill grade detection step;

determining, when said running road has been determined as the meandering downhill road in said meandering downhill road determining step, whether or not a downshift is needed; and shifting the speed range of said vehicle automatic transmission from a current speed range to a speed range lower than said current speed range when the downshift has been determined to be necessary in said downshift determining step.

(B-1)

In the method (B), by fuzzy inference making use of the degree of meandering and the downhill grade as input variables, said meandering downhill road determining step determines whether or not said running road is a meandering downhill road.

(B-2)

In the method (B), said downhill grade detection step detects the downhill grade on the basis of the engine load detected in said engine load detection step; and said meandering degree detection step detects the degree of meandering on the basis of the differential acceleration of said vehicle.

(B-3)

In the method (B) including the features (B-2), said meandering downhill road determining step determines whether or not said running road is a meandering downhill road, based on:

an average value of engine load obtained by averaging engine loads which have been detected in said engine load detection step during a first predetermined period preceding the determination in said meandering downhill road determining step; and a quantity of differential acceleration obtained by processing differential accelerations which have been detected in said differential acceleration detecting step during a second predetermined period preceding the determination in said meandering downhill road determining step.

(B-4)

In the method (B) including the features (B-3), said meandering downhill road determining step determines the running road as a meandering downhill road when the average value of engine load is small and the quantity of differential acceleration is large.

(B-5)

The method (B) further comprises the following step:

detecting a deceleration of said vehicle;

wherein when said running road has been determined as the meandering downhill road in said meandering downhill road determining step, said downshift determining step determines whether or not a downshift is needed, on the basis of the results of a detection in said deceleration detecting step.

(B-6)

The method (B) including the features (B-5) further comprises the following step:

detecting whether or not a braking operation has been made by a driver of said vehicle;

wherein said deceleration detecting step detects a deceleration of said vehicle upon detection of the braking operation in said braking operation detecting step; and when said running road has been determined as a meandering downhill road in said meandering downhill road determining step, said downshift determining step determines whether a downshift is needed or not, based on the deceleration during the braking operation detected in said deceleration detecting step.

(B-7)

In the method (B) including the features (B-5), said meandering downhill road determining step determines the degree of meandering downhill of said running road; and said downshift determining step determines whether a downshift is needed or not, by fuzzy inference making use of the degree of meandering downhill and the deceleration as input variables, said degree of meandering downhill and said deceleration having been determined in said meandering downhill road determining step and detected in said deceleration detecting step, respectively.

(B-8)

In the method (B) including the features (B-5), the degree of meandering downhill determined in said meandering downhill road determining step and the deceleration detected in said deceleration detecting step are both large, said downshift determining step determines that a downshift is needed.

(B-9)

The method (B) including the feature (B-5) further comprises the following step:

detecting a load of an engine mounted on said vehicle;

wherein said downhill grade detection step detects a downhill grade on the basis of the engine load detected in said engine load detection step; and said downshift determining step determines whether or nor a downshift is needed, based on an average value of engine load obtained by averaging engine loads detected during a third predetermined period immediately before the determination in said downshift determining step.

(B-10)

In the method (B) including the features (B-9), when the degree of meandering downhill determined in said meandering downhill road determining step and the deceleration detected in said deceleration detecting step are both large and the average value of engine load is small, said downshift determining step determines that a downshift is needed.

Since the method (B) and its optional features (B-1 to B-10) are similar in operation and advantages to the system (A) and its optional features (A-1 to A-10), the operation and advantages of the system and its optional features will hereinafter be described and those of the method will be omitted herein.

System (A) and Method (B)

The meandering degree detection means detects the meandering degree of the running road on which the vehicle is running, and the downhill grade detection means detects the downhill grade of the running road. Based on the results of detections by the meandering degree detection means and the downhill grade detection means, the meandering downhill road determining means determines whether or not the running road is a meandering downhill road. When the running road has been determined as the meandering downhill road by the meandering downhill road determining means, the downshift determining means determines whether or not a downshift is needed. When the downshift has been determined to be necessary by the downshift determining means, the speed range shifting means shifts the speed range of the vehicle automatic transmission from a current speed range to a speed range lower than the current speed range.

As a consequence, it is possible to achieve selection of such a speed range as permitting application of an adequate engine brake on such a meandering downhill road, so that driving can be facilitated further.

Optional features (A-1) and (B-1)

By the fuzzy inference making use of the degree of meandering and the downhill grade as input variables, the meandering downhill road determining means determines whether or not the running road is a meandering downhill road.

The fuzzy inference making use the degree of meandering and the downhill grade as input variables is extremely simple and further, can surely and promptly perform the determination of whether or not the running road is a meandering downhill road. On a meandering downhill road, an engine brake can be surely and promptly applied by a downshift.

Optional features (A-2) and (B-2)

The downhill grade detection means detects the downhill grade on the basis of the engine load detected by the engine load detection means. The meandering degree detection means detects the degree of meandering on the basis of the differential acceleration of the vehicle detected by the differential acceleration detecting means.

For the detection of the engine load, a conventional sensor useful for the control of shifting of an ordinary automatic transmission can be used. The detection of the differential acceleration of the vehicle can also be achieved using vehicle speed detection means mounted on the vehicle. It is hence possible to easily and surely detect the meandering degree and the downward grade without addition of any special sensors.

Optional features (A-3) and (B-3)

Based on an average value of engine load obtained by averaging engine loads, which have been detected by the engine load detection means during a first predetermined period preceding the determination by the meandering downhill road determining means, and also on a quantity of differential acceleration obtained by processing differential accelerations which have been detected by the differential acceleration detecting means during a second predetermined period preceding the determination by the meandering downhill road determining means, the meandering downhill road determining means determines whether or not the running road is a meandering downhill road.

The above-described determination of the running road as a meandering downhill road by using the average value of engine load and the quantity of differential acceleration makes it possible to quantitatively and totally determine, for example, the meandering downhill state of the running road such as the degree of meandering downhill, and is therefore suited for the utilization of fuzzy inference.

Further, the average value of engine load and the quantity of differential acceleration are each obtained by processing many data obtained during a period predetermined for the corresponding parameter. These values therefore have higher reliability, thereby making the determination of a meandering downhill road without failure.

Optional features (A-4) and (B-4)

When the average value of engine load is small and the quantity of differential acceleration is large, the meandering downhill road determining means determines the running road as a meandering downhill road.

In general, the average value of engine load becomes small on a downhill road and the quantity of differential acceleration of the vehicle becomes greater on a meandering road. By the above determination method, a meandering downhill road can therefore be determined easily without failure.

Optional features (A-5) and (B-5)

The deceleration detecting means detects a deceleration of the vehicle. When the running road has been determined as a meandering downhill road by the meandering downhill road determining means, the downshift determining means determines based on the detection results by the deceleration detecting means whether or not a downshift is needed.

While the vehicle is running on a meandering downhill road, a deceleration of the vehicle can usually be taken as having been caused by a decelerating operation by the driver. When the driver has indicated his intention of deceleration while running on a meandering downhill road, an engine brake is applied by a downshift so that the downshift can be effected without giving any sense of incongruity to the driver. Accordingly, the engine brake can be applied in accordance with the deceleration as intended by the driver.

Optional features (A-6) and (B-6)

The braking operation detecting means detects whether or not a braking operation has been made by the driver of the vehicle. The deceleration detecting means detects a deceleration of the vehicle upon detection of the braking operation by the braking operation detecting means. When the running road has been determined as a meandering downhill road by the meandering downhill road determining means, the downshift determining means determines, based on the deceleration during the braking operation detected by the deceleration detecting means, whether or not a downshift is needed.

A deceleration of a vehicle which is running on a meandering downhill road therefore can be reliably determined as having been caused by the driver's decelerating operation. A downshift can therefore be effected without giving any sense of incongruity to the driver, so that an engine brake can be applied in accordance with the deceleration as intended by the driver.

Optional features (A-7) and (B-7)

The meandering downhill road determining means determines the degree of meandering downhill of the running road. The downshift determining means determines whether a downshift is needed or not, by fuzzy inference making use of the degree of meandering downhill and the deceleration as input variables, the degree of meandering downhill and the deceleration having been determined by the meandering downhill road determining means and detected by the deceleration detecting means, respectively.

The fuzzy inference making use of the degree of meandering downhill and the deceleration as input variables as described above is simple, thereby permitting sure and prompt determination as to whether the running road is a meandering downhill road or not. The degree of meandering downhill corresponds to the degree of an engine brake demanded by the conditions of a road on which the vehicle is running, while the deceleration corresponds to the degree of the driver's intention for deceleration. The conditions of the road and the driver's intention for deceleration can therefore be reflected precisely, so that application of an engine brake by a downshift can be promptly effected without failure.

Optional features (A-8) and (B-8)

When the degree of meandering downhill obtained by the meandering downhill road determining means and the deceleration detected by the deceleration detecting means are both large, the downshift determining means determines that a downshift is needed.

When the degree of meandering downhill is high, it can generally be determined that the conditions of a road on which a vehicle is running require a strong engine brake. A large deceleration of the vehicle, on the other hand, can be interpreted as the driver's strong intention for deceleration. When these conditions are met, a downshift is determined to be necessary and application of an engine brake is effected by the downshift. The conditions of the road and the driver's intention for deceleration can therefore be precisely reflected to the state of running of the vehicle, thereby making it possible to perform comfortable and high-safety running.

Optional features (A-9) and (B-9)

The engine load detection means detects a load of the engine and based on the engine load so detected by the engine load detection means, the downhill grade detection means detects a downhill grade. The downshift determining means determines whether or not a downshift is needed, based on an average value of engine load obtained by averaging engine loads detected during a third predetermined period immediately before the determination by the downshift determining means.

As a consequence, the need for a downshift can be determined promptly without failure so that application of an engine brake by the downshift can be effected promptly without failure.

Optional features (A-10) and (B-10)

When the degree of meandering downhill determined by the meandering downhill road determining means and the deceleration detected by the deceleration detecting means are both large and the average value of engine load is small, the downshift determining means determines that a downshift is needed.

BRIEF DESCRIPTION OF THE DRAWINGS

FIG. 3 is a diagram showing membership functions useful for fuzzy inference which is performed to determine a downshift by the shift control system and method, both of which relate to the first embodiment of the present invention;

FIG. 7 is a flow chart showing procedures of shift control by a shift control system and a shift control method, both of which relate to a second embodiment of the present invention.

DESCRIPTION OF THE INVENTION AND PREFERRED EMBODIMENTS

Figure 1:
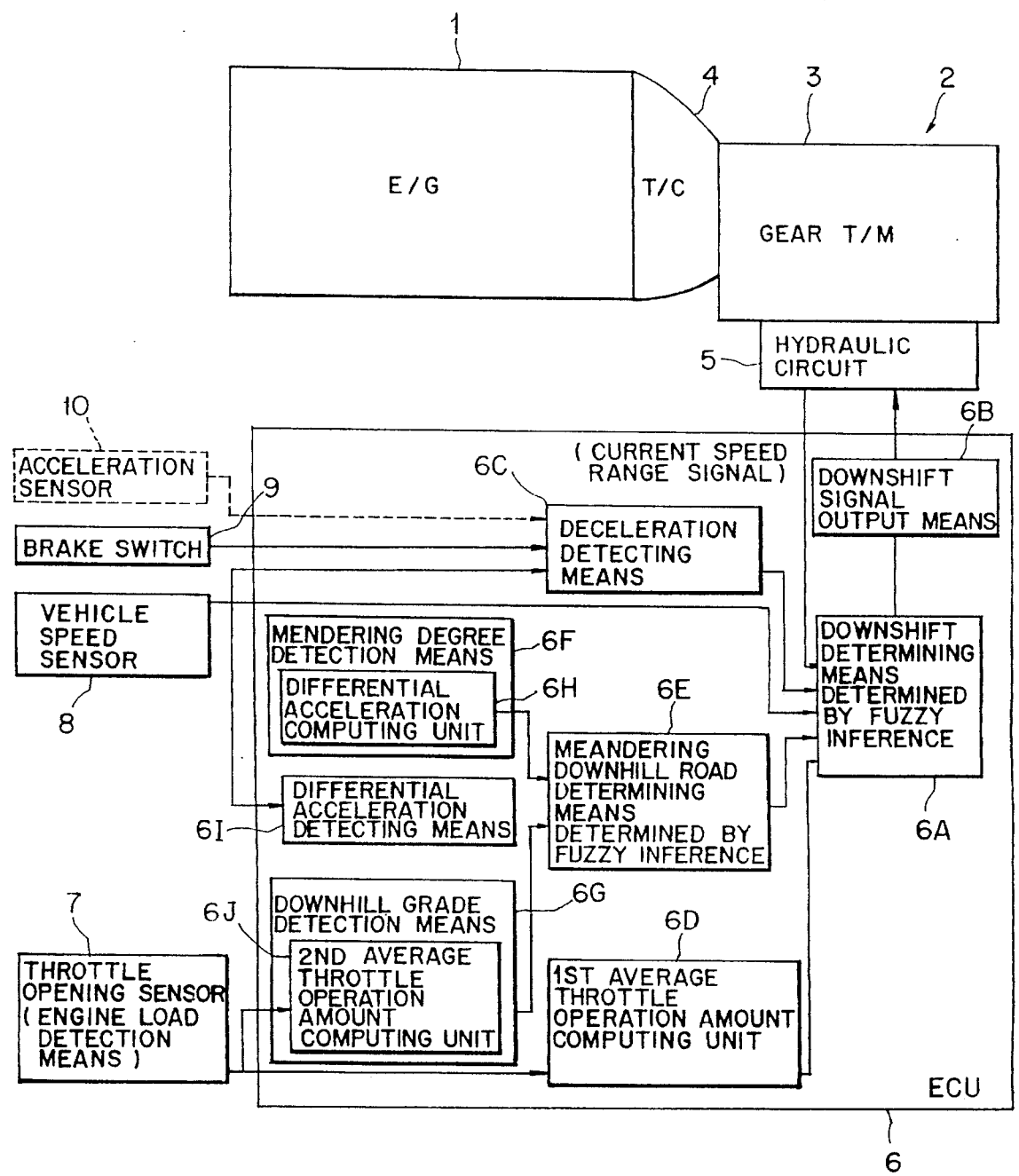
FIG. 1 is a simplified block diagram of a shift control system according to a first embodiment of the present invention, which is suited for use with a vehicle automatic transmission.

The shift control system according to the first embodiment of the present invention, which is suitable for use with a vehicle automatic transmission, will be described first. As shown in FIG. 1, the automatic transmission which is designated at numeral 2 and is provided with the shift control system is constructed inter alia of a gear transmission (T/M) 3 having plural speed ranges, a torque converter (T/C) 4 for transmitting an output from an (internal combustion) engine 1 to the gear transmission 3, a hydraulic circuit 5 associated with the gear transmission 3 and having the function of speed-range change-over means, and an electronic control unit forming principal units of the shift control system (hereinafter abbreviated as "ECU") 6.

The gear transmission 3 has, for example, 4-forward/1-reverse speed ranges and frictional engagement elements for changing over the gear position to perform shifting, such as hydraulic clutches and hydraulic brakes. The hydraulic circuit 5 includes duty solenoid valves (hereinafter simply called the "solenoid valves") arranged corresponding to the frictional engagement elements mentioned above, whereby the speed range can be changed over by independently operating the corresponding frictional engagement elements, namely, the corresponding hydraulic clutches and hydraulic brakes. Each solenoid valve is electrically connected to an output side of ECU 6, so that the solenoid valve is actuated by a control signal from ECU 6 to regulate the pressure of working fluid to be supplied to the corresponding frictional engagement element.

ECU 6 is internally equipped with memories such as ROM and RAM, a central processing unit, an I/O device, a counter, etc. although they are not shown in FIG. 1. Electrically connected to an input side of ECU 6 are, for example, a throttle opening sensor 7, a vehicle speed sensor 8, a brake switch 9, and although not shown in the diagram, various sensors such as a turbine speed sensor ($N_T$ sensor) for detecting a turbine speed $N_T$ of the torque converter 4.

The throttle opening sensor 7 is arranged in an unillustrated intake passage of the engine 1 at an intermediate point thereof and detects an opening $\theta_{th}$ of a throttle valve as a parameter indicating an engine load. In the illustrated embodiment, the vehicle speed sensor 8 is designed to calculate a vehicle speed from a detection value of an $N_O$ sensor which detects a revolution speed $N_O$ of an unillustrated transfer drive gear, that is, a revolution speed of an output shaft of the gear transmission 3. The vehicle sensor 8 may however be designed to calculate a vehicle speed, for example, from a detection value of a wheel speed sensor. The brake switch 9 is a switch arranged in such a way that it is associated with an unillustrated brake pedal and is turned on upon depression of the brake pedal. As an alternative, a stop lamp switch can be used as the brake switch 9. Incidentally, calculation of a differential acceleration (a second-order derivative of a speed) V" which is used to determine a meandering downhill degree Z as will be described subsequently herein is also performed based on a detection value of the $N_O$ sensor in the illustrated embodiment. Further, detection values of the $N_O$ sensor and the $N_T$ sensor are also used to determine the completion of shifting and a current speed range n.

To change the speed range of the automatic transmission, the above-described solenoid valves are duty-controlled based on a command from ECU 6 so that desired frictional engagement elements are engaged or disengaged (released). To upshift from the second speed range to the third speed range, for example, frictional engagement of each frictional engagement element which has established the second speed range is released and each frictional engagement element required for the establishment of the third speed range is brought into frictional engagement. No particular limitation is imposed on the frictional engagement of the frictional engagement element or the release of the frictional engagement. Various known means can be adopted for this purpose.

While a vehicle is running on a meandering downhill road, ECU 6 in the shift control system determines in accordance with the degree of the driver's demand for deceleration whether or not a downshift should be effected to apply an engine brake. Based on this determination, the downshift is effected.

Accordingly, ECU 6 is provided with a function unit (hereinafter called the "meandering down hill road downshift determining means" or abbreviated as the "downshift determining means") 6A for determining whether or not a downshift should be effected and also with another function unit (hereinafter called the "downshift signal output means") 6B for outputting a downshift command signal on the basis of the determination by the downshift determining means.

The meandering downhill road downshift determining means 6A is inputted at predetermined intervals with a degree of meandering downhill (meandering downhill degrees) Z of a road on which the vehicle is running, a vehicle speed V, an average of throttle openings $\theta_{th}$ from n seconds before till now, the average throttle opening being equivalent to the history of latest throttle openings, a current speed range n and a braked deceleration $\eta$. Based on these values, the meandering downhill road downshift determining means 6A determines whether a downshift should be conducted or not.

Of the individual data, the vehicle speed V, the first average throttle operation amount $\phi$ and the current speed range n are quantities corresponding to downshift effectiveness which means how the running state of the vehicle is effective for a downshift. A greater speed V leads to higher downshift effectiveness, a higher current speed range n leads to higher downshift effectiveness, and a smaller average throttle operation amount leads to higher downshift effectiveness. However, a large average throttle operation amount $\phi$ may conversely prevent a downshift in some instances, in other words, it is possible to say that a downshift can be performed more easily as the average throttle operation amount $\phi$ becomes smaller.

Incidentally, the period from n seconds before till now (n seconds) corresponds to "the third predetermined period immediately before the determination" as recited in the claims. Since it is necessary to instantaneously determine whether a downshift is needed or not, the n seconds in the third predetermined period for the determination of the average throttle operation amount $\phi$ are set as a relatively short period, for example, as 2 seconds or so.

The braked deceleration $\eta$, on the other hand, corresponds to a deceleration demand degree which indicates the degree of the vehicle driver's demand for a deceleration.

In particular, this meandering downhill road downshift determining means 6A receives as input variables the meandering downhill degree Z, the vehicle speed V, the average throttle operation amount $\phi$, the current speed range n and the braked deceleration $\eta$, determines the goodness of fit $S_z$ of a downshift by using fuzzy inference, and performs determination while evaluating this goodness of fit $S_z$.

Of the input variables referred to above, the vehicle speed V is obtained from the vehicle sensor 8. The current speed range n can be determined from detection values of the $N_O$ sensor and the $N_T$ sensor. The braked deceleration $\eta$ is a deceleration upon braking and in the illustrated embodiment, is obtained by differentiating vehicle speed values, which are obtained from the vehicle speed sensor 8, with respect to time at deceleration detecting means 6C (which is equivalent to a processing function unit in the illustrated embodiment) while an ON signal is being received from the brake switch 9. As is illustrated by dashed lines in FIG. 1, an acceleration sensor 10 for detecting a longitudinal acceleration of the vehicle can also be arranged as the deceleration detecting means so that a braked deceleration $\eta$ can be obtained directly.

The first average throttle operation amount $\phi$ corresponds to the history of latest throttle openings. This first average throttle operation amount is an average of throttle openings in the third period from n seconds before till now, and is calculated at a first average throttle operation amount computing unit 6D in accordance with the following formula (1):

$$\theta = \qquad (1)$$

(the sum of throttle openings $\theta_{th}$ from n seconds before till now) ÷

(time constant)

Incidentally, the throttle openings $\theta_{th}$ are detected at predetermined intervals and are stored in the memory. The average throttle operation amount $\phi$ is obtained by averaging detection values of the throttle opening from n seconds before till the last detection, said detection values being stored in the memory as described above, and a currently-detected detection value.

In the illustrated embodiment, the meandering downhill degree Z is estimated by a meandering downhill road determining means 6E by using fuzzy inference.

This meandering downhill degree Z is a degree indicating how much a road on which the vehicle is running is fitted to a "meandering downhill road". Here, the term "meandering downhill road" means a meandering road of a downhill slope which is often found in mountainous regions. The degree of meandering (meandering degree) of a road and the degree of downhill slope (downhill grade) of the road can be ranked as the meandering downhill degree Z.

It is therefore necessary to numerically express these meandering degree and downhill grade from information on driving of a vehicle.

The meandering degree is calculated by meandering degree detection means 6F while the downhill grade is calculated by downhill grade detection means 6G. In the present embodiment, a differential speed amount $\Delta G$ corresponding to the above-described differential speed (the second-order derivative of the speed) V" is used as a parameter indicating the degree of meandering, and a second average throttle operation amount $\phi_z$ corresponding to an average of throttle openings during the below-described first predetermined period is employed as a parameter indicating a downhill grade. By fuzzy inference making use of these differential acceleration amount $\Delta G$ and second average throttle operation amount $\phi_z$ as input variables, the meandering downhill degree Z is estimated.

The meandering degree detection means 6F is therefore provided with a differential acceleration amount computing unit 6H which computes the differential acceleration amount $\Delta G$. The meandering degree detection means 6F is also provided with differential acceleration detecting means 6I which can obtain the differential acceleration V" by differentiating vehicle speed data obtained from the vehicle speed sensor 8. The differential acceleration amount computing unit 6H calculates the differential acceleration amount $\Delta G$ by the below-described processing of the differential acceleration V" obtained from the differential acceleration detecting means 6I as described above.

The second average throttle operation amount $\phi_z$ is an average of throttle openings from x seconds before to now, said average corresponding to the history of throttle openings in a first predetermined period (x seconds) immediately before the present time, and is calculated in accordance with an arithmetic expression which is to be described subsequently herein.

On the other hand, the magnitude of a throttle operation amount (throttle opening) generally tends to correspond to the grade of a road. For example, the throttle operation amount becomes greater on a road of an uphill grade and the throttle operation amount conversely tends to become smaller on a road of a downhill grade. It may therefore be sufficient to use a throttle operation amount as a parameter indicating a downhill grade. This throttle operation amount may however be finely adjusted moment by moment by the driver so that a single piece of datum may not fully correspond a downhill grade. The second average throttle operation amount $\phi_z$ is therefore employed as a parameter indicating a downhill grade.

This second average throttle operation amount $\phi_z$ corresponds to the history of latest throttle openings like the above-described first average throttle operation amount $\phi$. However, the period during which the throttle opening is detected is different between the second average throttle operation amount $\phi_z$ and the first average throttle operation amount $\phi$. Described specifically, the second average throttle operation amount $\phi_z$ is an average of throttle openings during a period from x seconds before till now (which corresponds to the first predetermined period) and is calculated by a second average throttle operation amount computing unit 6J in accordance with the below-described formula (2).

Incidentally, this second average throttle operation amount $\phi_z$ determines the downhill grade of a running road on which the vehicle is running now. The x seconds of the first predetermined period are therefore set as a relatively long period, for example, at 10 seconds or so.

$$\Theta_z = \quad (2)$$

(the sum of throttle openings $\theta_{th}$ from x seconds before till now) ÷

(time constant)

On the other hand, the differential acceleration amount $\Delta G$ can be calculated in accordance with the following formula (3):

$$\Delta G = \text{(the sum of the squares of differential accelerations } V'' \quad (3)$$
from y seconds before till now)

The period from y seconds before till now corresponds to "the second predetermined period preceding the determination" as recited in the claims.

Further, this differential acceleration $\Delta G$ determines the degree of meandering of a running road on which the vehicle is running now. The y seconds of the second predetermined period are therefore set as a relatively long period, for example, at 20 seconds or so.

It is for the following reasons that this differential acceleration $V''$ is employed as a parameter indicating the degree of meandering.

Now, assume that the vehicle is running on a downhill slope of a constant grade and is turning a corner. In general, it is known that the following formula (4) is established between the acceleration (first-order derivative of speed V) $V'$ of the vehicle and the engine margin torque of the vehicle:

$$\text{Engine margin torque} = (V' \times 2\pi \times r \times W)/(G \times \text{final reduction ratio}) \quad (4)$$

where r: tire radius,

W: vehicle weight, and

G: gravitational acceleration.

Further, the engine margin torque can be expressed by the following formula (5):

$$\text{Engine margin torque} = \text{engine output} - \quad (5)$$

rolling resistance − cornering resistance − air resistance − acceleration resistance

Assuming that the engine output, the rolling resistance, the air resistance and the acceleration resistance are constant, a change in the engine margin resistance between a time point immediately before the vehicle is entering the corner and another time point at which the vehicle is cornering will be discussed based on the above formulas (4) and (5). The following formula (6) is then established:

$$\text{Cornering resistance} = [(V_0' - V_1') \times \quad (6)$$

$2\pi \times r \times W]/(G \times \text{final reduction ratio})$ where $V'_0$: the acceleration immediately before the vehicle enters the corner, $V'_1$: the acceleration during cornering.

As is apparent from the formula (6), the cornering resistance is proportional to $(V'_0-V'_1)$, that is, the rate of a change in acceleration (i.e., differential acceleration). Accordingly, the differential acceleration $V''$ is used as a parameter indicating the degree of meandering.

Figure 5:
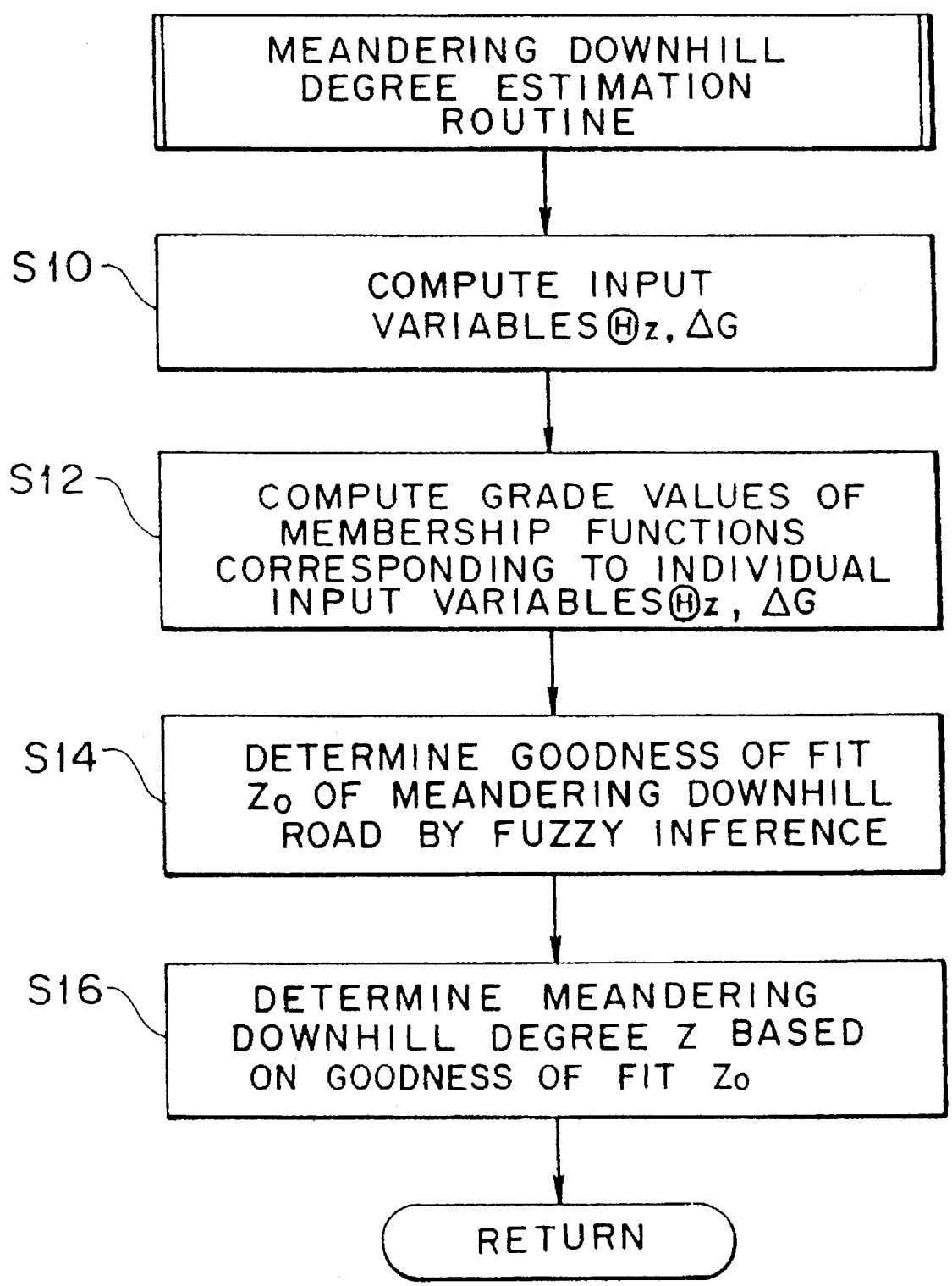
FIG. 5 is a flow chart illustrating procedures for the determination of the degree of meandering downhill which is useful in the determination of a downshift by the shift control system and method, both of which relate to the first embodiment of the present invention.

Estimation of the meandering downhill degree Z is carried out by repeatedly executing at predetermined intervals such an inference routine as shown in FIG. 5 by ECU 6. In step S10, the average throttle operation amount $\phi_z$ and the differential acceleration amount $\Delta G$, input variables for fuzzy inference, are first calculated in accordance with the above-described formulas (2) and (3), respectively, from the throttle openings $\theta_{th}$ detected by the throttle opening sensor 7 and the differential acceleration (second-order derivative of speed V) $V''$ determined from the revolution speed $N_O$ detected by the $N_O$ sensor.

In practice, the differential acceleration amount $\Delta G$ is computed at ECU 6 as will be described next. First, the vehicle speed V is computed from the number of revolutions (revolution speed) $N_O$ of the transfer drive gear detected by the $N_O$ sensor and the vehicle speed V computed each time is stored in the above-described memory. An acceleration $V'$ is computed from the difference in the vehicle speed V between the last value and the present value. This acceleration $V'$ is stored in the memory whenever it has been computed. From the difference in the acceleration $V'$ between the last value and the present value, the differential acceleration $V''$ is computed. This differential acceleration $V''$ is stored whenever it has been computed. Based on the values of the differential acceleration $V''$ from y seconds before till now and the currently-computed value of the differential acceleration $V''$, said former values and said later value having been stored, the differential acceleration amount $\Delta G$ is calculated as the sum of the squares of these values.

From the fuzzy input variables $\phi_z$ and $\Delta G$ obtained as described above, the goodness of fit $Z_0$ of the meandering downhill road is estimated by fuzzy inference at a prescribed part in ECU 6. There are various methods for this fuzzy inference. Known methods include the "max-min composition center of gravity method", the "algebraic product-addition-composition center of gravity method" and the "simplified method". Although this fuzzy inference performed by ECU 6 may use any one of these methods, a description will next be made of fuzzy inference of the goodness of fit $Z_0$ of the meandering downhill road by the simplified method.

Figure 6:
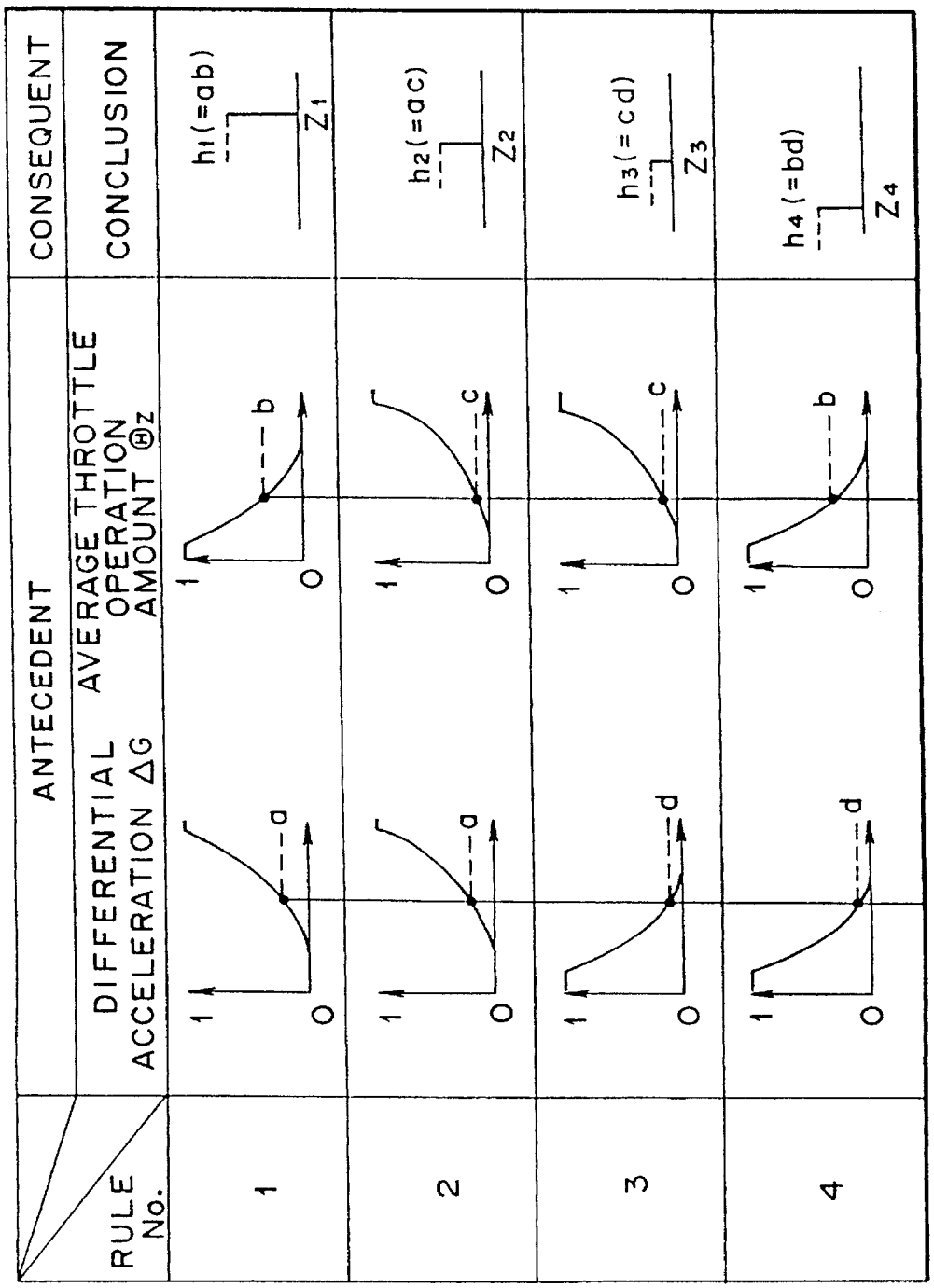
FIG. 6 is a diagram depicting membership functions useful for fuzzy inference which is performed to determine a downshift by the shift control system and method, both of which relate to the first embodiment of the present invention.

At the prescribed part in ECU 6, the goodness of fit (grade value) of each of the fuzzy input variables $\phi_z$ and $\Delta G$ is determined in accordance with each fuzzy rule in step S12. This rule is, as shown under "Antecedent" in FIG. 6, is a combination of membership functions for the differential acceleration amount $\Delta G$ and the average throttle operation amount $\phi_z$, respectively. In the illustrated embodiment, two membership functions are provided for each of the differential acceleration amount $\Delta G$ and the average throttle operation amount $A_z$. In the form of combinations of these membership functions, four fuzzy rules are provided. Described specifically, the membership function for the differential acceleration amount $\Delta G$ under each of rule 1 and rule 2 gives the goodness of fit (grade) on a meandering road. The membership function for the differential acceleration amount $\Delta G$ under each of rule 3 and rule 4 gives the goodness of fit (grade) on a straight road. Further, the membership function for the average throttle operation amount $\phi_z$ under each of rule 1 and rule 4 gives the goodness of fit (grade) on a downhill grade while the membership function for the average throttle operation amount $\phi_z$ under each of rule 2 and rule 3 gives the goodness of fit (grade) on an uphill grade.

The grade values of certain differential acceleration amount $\Delta G$ and average throttle operation amount $\phi z$, for example, such as those shown in FIG. 6 can be determined as a, b, c and d from the membership functions.

At the prescribed part of ECU 6, the goodness of fit $Z_0$ of the meandering downhill road is next determined by fuzzy inference in step S14. Determined first are the chances $h_i$ (i= 1 to 4) that real values (evaluation values) $Z_i$ (i= 1 to 4) as the conclusions of the individual rules can be obtained from the grade values a, b, c and d. In other words, the chance $h_i$ obtained from each real value $Z_i$ is determined as the product of grade values which are obtained from the individual membership functions for the i-th rule. For example, the chance $h_1$ that the real value $Z_1$ is obtained in rule 1 is determined as the product of the grade values a and b (= ab), the chance $h_2$ that the real value $Z_2$ is obtained in rule 2 as the product of the grade values a and c (= ac), the change $h_3$ that the real value $Z_3$ is obtained in rule 3 as the product of the grade values c and d (= cd), and the chance $h_4$ that the real value $Z_4$ is obtained in rule 4 as the product of the grade values b and d (= bd).

From these real values $Z_i$ and their chances $h_i$, the goodness of fit $Z_0$ of the meandering downhill road is calculated in accordance with the following formula (7):

$$Z_0=(Z_1h_1+Z_2h_2+Z_3h_3+Z_4h_4)/(h_1+h_2+h_3+h_4) \quad (7)$$

A desired value can be set as each real value $Z_i$. If the real value $Z_1$ in rule 1 is set at value 1, the goodness of fit can be concluded to be large under rule 1 when the differential acceleration amount $\Delta G$ is large and the average throttle operation amount value $\phi_z$ is small. If the real value $Z_2$ in rule 2 is set at value (–1), the goodness of fit can be concluded to be small under rule 2 when the differential acceleration amount $\Delta G$ is large and the average throttle operation amount value $\phi_z$ is large.

Since it is now intended to determine the goodness of fit $Z_0$ of the meandering downhill road, it is considered to set, for example, the real value $Z_1$ in rule 1 at value 1, the real values $Z_2$ and $Z_4$ in rules 2 and 4 at value 0.5 and the real value $Z_3$ in rule 3 at value 0 or the real value $Z_1$ in rule 1 at value 1, the real values $Z_2$ and $Z_4$ in rules 2 and 4 at value 0 and the real value $Z_3$ in rule 3 at value (–1).

After the goodness of fit $Z_0$ of the meandering downhill road has been calculated as described above, the meandering downhill degree Z is next determined based on the goodness of fit $Z_0$ at the prescribed part of ECU 6 in step S16. It may be considered to set this meandering downhill degree Z, for example, at a value proportional to the goodness of fit $Z_0$ by multiplying the goodness of fit $Z_0$ with an appropriate coefficient or to use the goodness of fit $Z_0$ itself as the meandering downhill degree Z.

By the meandering downhill road downshift determining means 6A, the goodness of fit $S_z$ of a downshift is determined by fuzzy inference from the meandering downhill degree Z, the vehicle speed V, the average throttle operation amount $\phi$, the current speed stage n and the braked deceleration $\eta$ as input variables. This goodness of fit $S_z$ is then compared with a preset value (threshold) $\alpha$ to determine whether or not the downshift should be performed on the meandering downhill road.

As a method for the above fuzzy inference, it is also possible to use any one of such various methods as described above, for example, the "max-min composition center of gravity method", the "algebraic product-addition-composition center of gravity method" and the "simplified method". In connection with the present embodiment, a description will next be made of the fuzzy inference of the goodness of fit $S_z$ of the downshift by the simplified method employed above upon determination of the meandering downhill degree Z.

Figure 2:
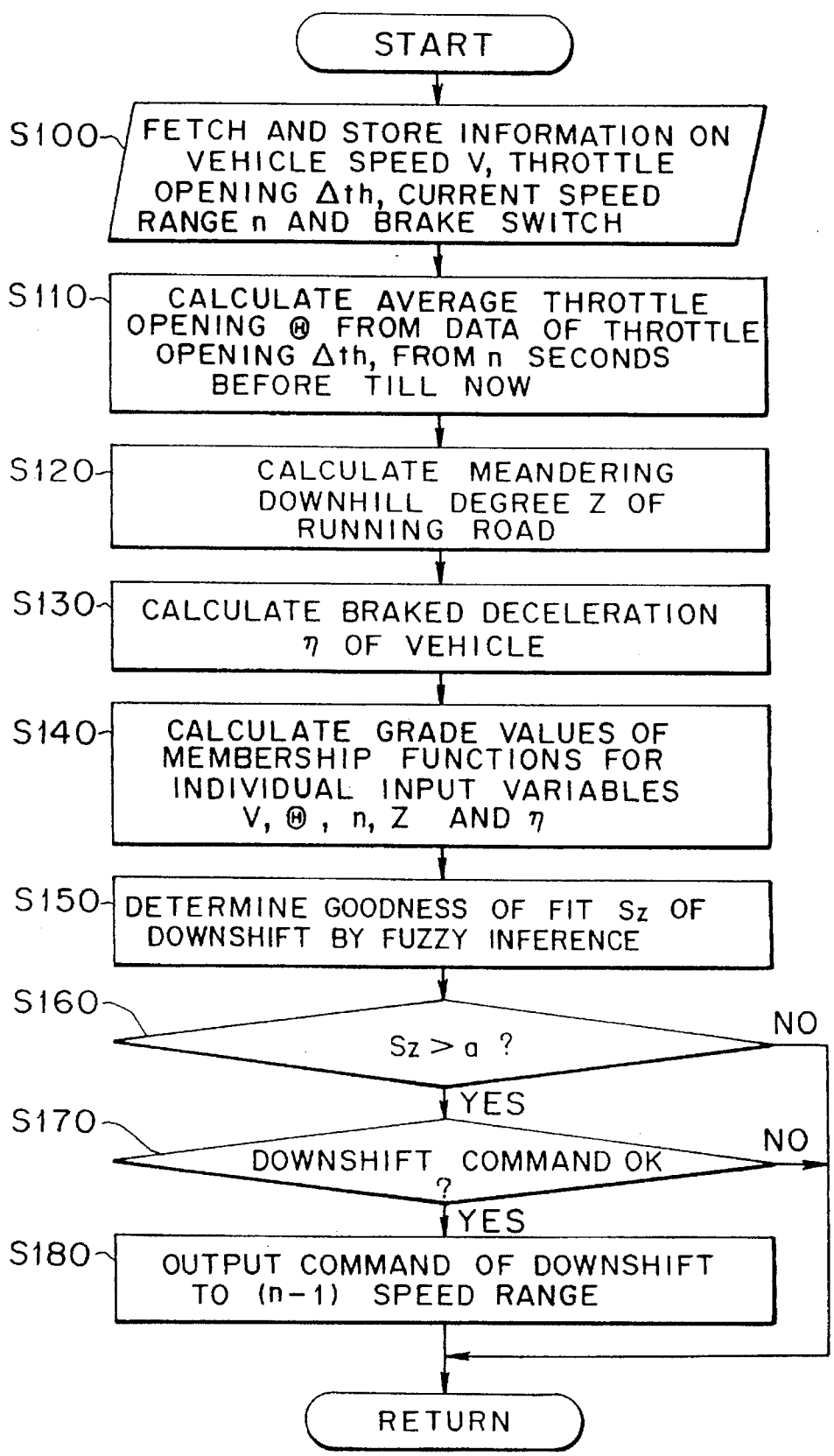
FIG. 2 is a flow chart showing procedures of shift control by the shift control system and a shift control method, both of which relate to the first embodiment of the present invention.
Figure 4A:
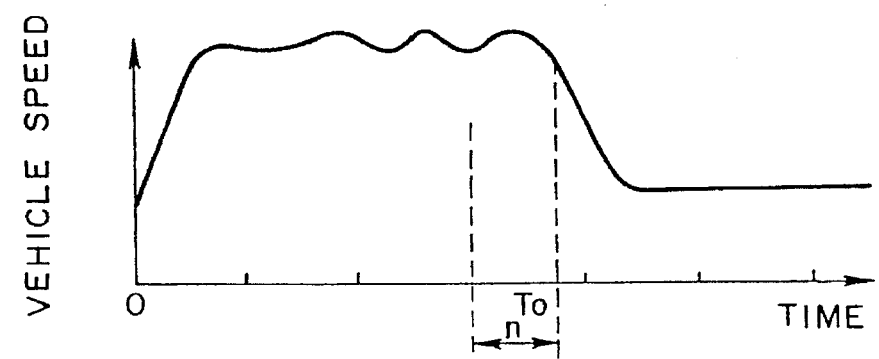
FIGS. 4(a)–(e) diagrammatically depict examples of timing at which shifting is conducted by the shift control system and method, both of which relate to the first embodiment of the present invention.
Figure 4B:
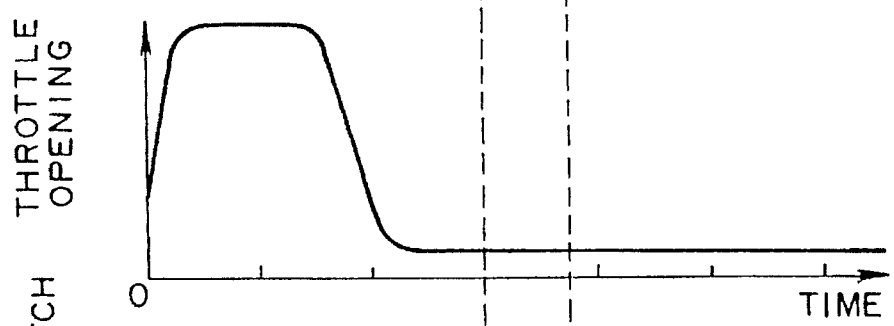
Figure 4C:
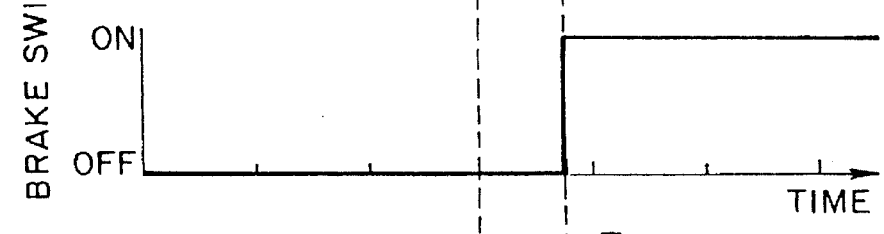
Figure 4D:
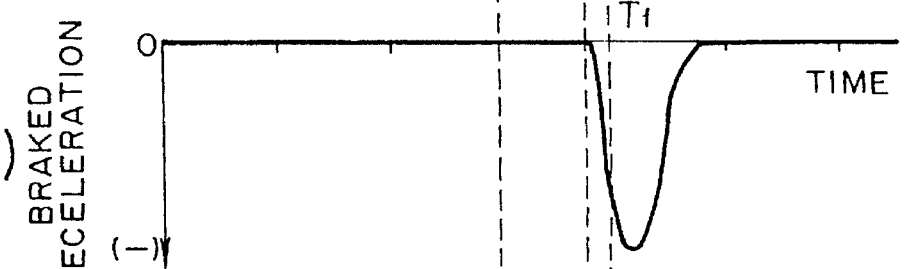
Figure 4E:
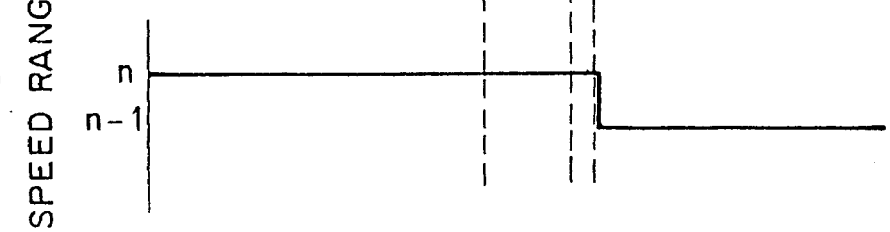

With reference to the flow chart of FIG. 2, a description will next be made of details of shift control performed by prescribed units of ECU 6 such as the meandering downhill road downshift determining means 6A and the downshift signal outputting means 6B.

In step S100, information on the vehicle speed V, the throttle openings $\theta_{th}$, the current speed stage n, the "ON/OFF" state of the brake switch and the like are fetched, and are then stored as needed. An average throttle operation amount $\phi$ is calculated from data of the throttle openings $\theta$th from n seconds before till now as described above (step S110). Further, the various data of the vehicle speed V and the throttle openings $\theta$th are processed as described above and by fuzzy inference, the meandering downhill degree Z of the running road is calculated (step S120). In addition, a braked deceleration $\eta$ is calculated from the information on the "ON/OFF" state of the brake switch and the vehicle speed V as described above (step S130).

After the meandering downhill degree Z, the vehicle speed V, the average throttle operation amount $\phi$, the current speed range n and the braked deceleration $\eta$ as input variables have been obtained as described above, the goodness of fit $S_z$ of the downshift is determined by fuzzy inference on the basis of these input variables.

Figure 3:
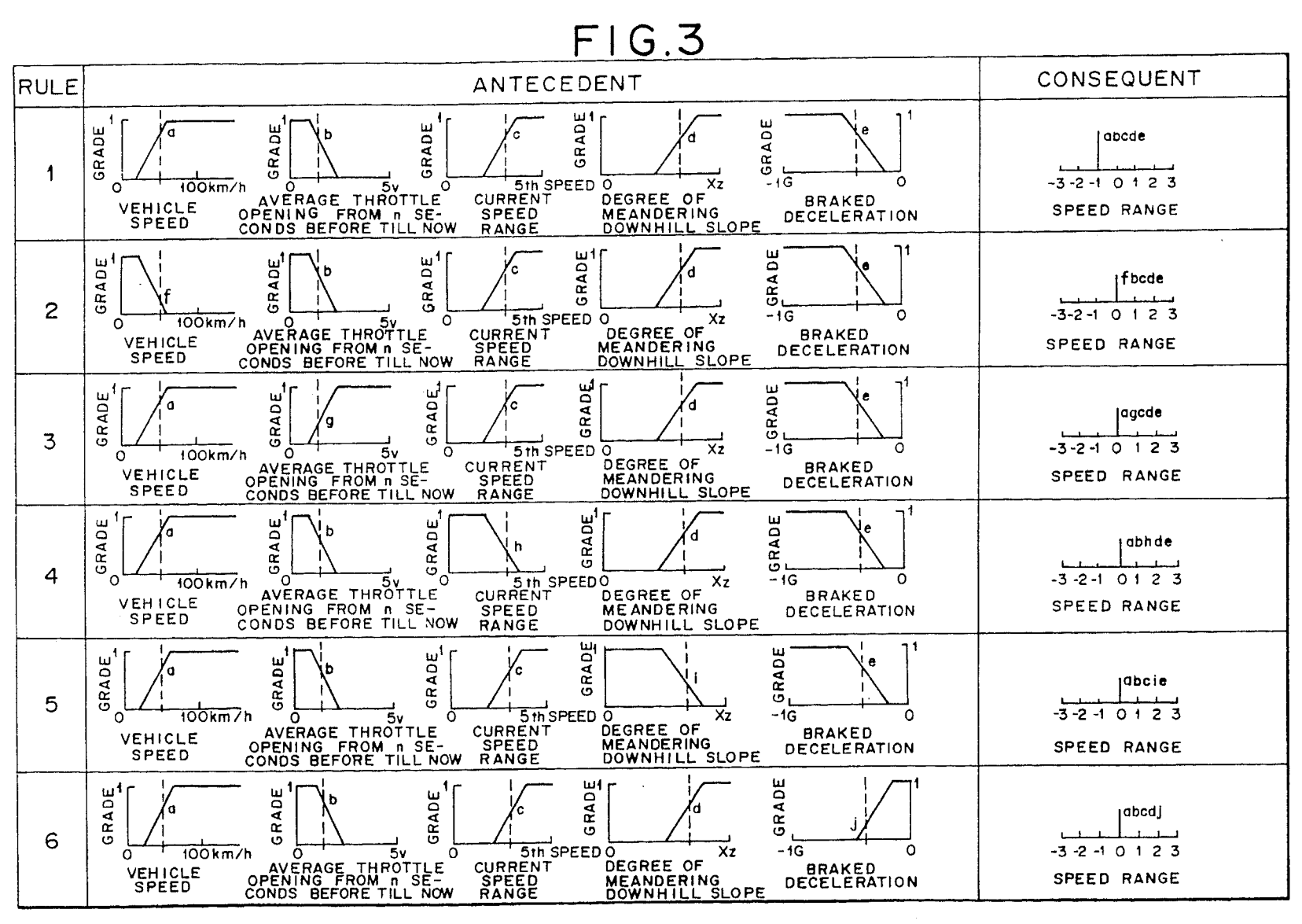

Described specifically, the grade values of the individual fuzzy input variables Z, V, $\phi$, n and $\eta$ are determined with respect to each of the fuzzy rules (step S140). Each fuzzy rule is, as shown under "Antecedent" in FIG. 3, is a combination of the corresponding membership functions. From the respective membership functions, the grade values on the input variables Z, V, $\phi$, n and $\eta$ are determined, respectively. Only some fuzzy rules are shown in FIG. 3. Although not shown in FIG. 3, many other fuzzy rules are also provided.

Of these rules, rule 1 will be described. The membership function for the vehicle speed V defines the grade that the vehicle speed V is high (or medium high). The membership function for the average throttle operation amount φ defines the grade that the average throttle operation amount φ is small. The membership function for the current speed range n defines the grade that the current speed range n is a high speed range. The membership function for the meandering downhill degree Z defines the grade that the meandering downhill degree Z is large. The membership function for the braked deceleration η defines the grade that the braked deceleration η is large.

On the other hand, rules 2 to 6 also shown in the diagram are set to define a grade of opposite meaning with respect to one of the five membership functions in rule 1 which is a basic rule.

Described specifically, in rule 2, the membership function for the vehicle speed V defines the grade that the vehicle speed is low. In rule 3, the average throttle operation amount φ defines the grade that the average throttle operation amount φ is large. In rule 4, the membership function for the current speed range n defines the grade that the current speed range n is a low speed range. In rule 5, the membership function for the meandering downhill degree Z defines the grade that the meandering downhill degree Z is small. In rule 6, the membership function for the braked deceleration η defines the grade that the braked deceleration η is small.

Further, the fuzzy rules not shown in the diagram include those set to define grades of opposite meanings with respect to two of the five membership functions in rule 1 (ten rules in total), those set to define grades of opposite meanings with respect to three of the five membership functions in rule 1 (ten rules in total), those set to define grades of opposite meanings with respect to four of the five membership functions in rule 1 (five rules in total), and a membership function set to define grades of opposite meanings with respect to all the five membership functions in rule 1 (one rule). Therefore, 32 fuzzy rules are provided in total.

As shown by way of example in FIG. 3, input of specific values as the meandering downhill degree Z, the vehicle speed V, the average throttle operation amount φ, the current speed range n and the braked deceleration η as input variables makes it possible to determine the respective grade values a to j from the corresponding membership functions.

Once the grade values a to j have been determined as described above, the chances $h_i$ (i= 1 to 6) that real values (evaluation values) $Z_i$ (i= 1 to 6) can be obtained from the grade values a to j as the conclusions of the respective rules are determined. Namely, the chance $h_i$ that this real value $Z_i$ is obtained is determined as the product of the grade values which are obtained from the respective membership functions in the i-th rule. For example, the chance $h_1$ that the real value $Z_1$ in rule 1 is obtained is determined as the product of the grade values a, b, c, d and e (= abcde). The chance $h_2$ that the real value $Z_2$ in rule 2 is obtained is determined as the product of the grade values f, b, c, d and e (= fbcde). The chance $h_3$ that the real value $Z_3$ in rule 3 is obtained is determined as the product of the grade values a, g, c, d and e (= agcde). The chance $h_4$ that the real value $Z_4$ in rule 4 is obtained is determined as the product of the grade values a, b, h, d and e (= abhde). The chance $h_5$ that the real value $Z_5$ in rule 5 is obtained is determined as the product of the grade values a, b, c, i and e (= abcie). The chance $h_6$ that the real value $Z_6$ in rule 6 is obtained is determined as the product of the grade values a, b, c, d and j (= abcdj). Chances are similarly determined with respect to the remaining rules.

From these real value $Z_i$ and their chances $h_i$, the goodness of fit $S_z$ of a downshift on the meandering downhill road is calculated in accordance with the following formula (7) (step S150):

$$S_z=(Z_1h_1+Z_2h_2+Z_3h_3+\ldots+Z_{32}h_{32})/(h_1+h_2+h_3+\ldots+h_{32}) \quad (7)$$

Similar to the above-described determination of the goodness of fit $Z_0$ of the meandering downhill road, each real value $Z_i$ can be set at a desired value. In the illustrated embodiment, rule 1 defines how much a downshift is needed on the meandering downhill road and rules 2 to 32 define how much a downshift is not needed on this meandering downhill road. It is therefore considered to set the real value $Z_1$ in rule 1 at a positive value (for example, 1) and each of the real values $Z_2$ to $Z_{32}$ in rules 2 to 32 at value 0. In this case, the individual real values $Z_1$ to $Z_{32}$ mean shifting of the speed range, value (1) for the real value $Z_1$ is set to mean that the speed range is downshifted by one range, and the value 0 for the real values $Z_2$ to $Z_{32}$ means that no shifting of the speed range is performed.

By specifically expressing the individual real values $Z_i$ and the chances $h_i$ in the above formula (7), the formula (7) can be rewritten as the following formula (8):

$$S_z = 1*abcde + 0*fbcde + 0_x\, agcde + 0*abhde + 0*abcie + \quad (8)$$
$$\ldots + 0*fbhij + 0*aghij + 0*fghij/\,(abcde + gbcde + agcde +$$
$$abhde + abcie + \ldots + fbhij + aghij + fghij)$$

Namely, $$S_z = 1*abcde/\,(abcd3 + fbcd3 + agcde + abhde + \quad (8A)$$
$$\ldots + fbhij + aghij + fghij)$$

The goodness of fit $S_z$ of the downshift on the meandering downhill road is calculated accordingly.

Once the goodness of fit $S_z$ of the downshift on the meandering downhill road has been calculated as described above, this goodness of fit $S_z$ is next compared with the preset threshold α in step S160 to determine whether or not the goodness of fit $S_z$ is greater than the threshold α. No downshift command is made unless the goodness of fit $S_z$ is greater than the threshold α. When the goodness of fit $S_z$ is greater than the threshold α, however, it is then determined in step S170 whether or not the downshift command is feasible. This determination is to stably perform each shifting operation. For example, it can be designed to inhibit any downshift command for a predetermined period (for example, 1 second) after the performance of the previous shifting. Accordingly, no downshift command is rendered feasible during this period and after the predetermined period has been elapsed, a downshift command becomes feasible.

When a downshift has been determined to be feasible in step S170, the routine then advances to step S180 so that a command signal is outputted to downshift the transmission to a speed range (n−1) lower by one range from the current speed range n.

One example of such a downshift operation along the passage of time will be described with reference to FIGS. 4(a)–(e). While running on a meandering road, for example, the vehicle speed changes as the vehicle passes through each corner of the road. Now assume that the driver applies a brake at a time point $T_O$ (the brake switch is hence turned on).

Also assume that during a predetermined period immediately before the braking (from n seconds before till now), the driver did not depress the accelerator pedal to any significant extent and also that at the time of the braking, the vehicle speed is medium high and the speed range is a high speed range (which correspond, for example, to 3rd or 4th speed range in the case of 4-forward speed ranges). In this case, the average throttle operation amount $\phi_z$ and differential acceleration amount $\Delta G$ in a predetermined period (from x seconds before till now) become greater so that the meandering downhill degree Z also becomes greater.

When the braked deceleration (deceleration G) becomes sufficiently large at a time point $T_1$, the goodness of fit $S_z$ of the downshift on the meandering downhill road becomes greater than the threshold $\alpha$ so that a downshift command to the speed range lower by one range is made to perform the downshift.

Since a downshift is controlled in accordance with the meandering downhill degree Z as described above, the downshift control can be properly conducted on a meandering downhill road on which an engine brake is required. Further, each downshift command is determined based on a braked deceleration, that is, a deceleration of the vehicle while the driver is braking the vehicle, so that the driver's intention for a deceleration can be precisely seized and the downshift can be performed adequately.

For example, the manner of braking has various characteristics due to differences between individual drivers. There are drivers who frequently apply pumping brakes as well as drivers who use brakes too much. The latter drivers are often found among beginners. If it is attempted to determine the driver's intention for a deceleration, for example, on the basis of the frequency of braking, false determination tends to be made with respect to these drivers so that a deceleration may be determined to be intended even if such a deceleration is not intended. It is therefore difficult to estimate the intention of a deceleration. The driver's intention for a deceleration is however determined based on a deceleration of the vehicle in the shift control system and method of this embodiment, so that even if a brake is applied frequently, no deceleration is determined to be intended insofar as the deceleration of the vehicle is small. If the driver has intention to decelerate, he should apply a strong brake so that the deceleration upon braking (i.e., the braked deceleration) should be large. The driver's intention for the deceleration can therefore be determined precisely from the braked deceleration.

This makes it possible to avoid an unnecessary downshift. Moreover, a downshift is performed when a strong brake is applied. Deviation in timing of the downshift can therefore be reduced, so that no sense of incongruity is given to the driver upon downshifting.

According to the braked deceleration, the intention for the deceleration can be determined instantaneously, leading to the advantage that the downshift can be achieved promptly.

Since the fuzzy inferences are used in this embodiment, there is the advantage that whether or not a downshift is to be performed can be determined by taking into parallel consideration how steep meandering downhill road on which a vehicle is running is (the meandering downhill degree), how much deceleration is demanded by the driver of the vehicle (the deceleration demand degree) and how effective the state of running of the vehicle is for a downshift (the downshift effectiveness).

A description will next be made of the shift control system and method according to the second embodiment. In the second embodiment, the determination as to whether or not a downshift should be performed is performed by the general "YES/NO determination" instead of fuzzy control.

As in the first embodiment, the meandering downhill road downshift determining means 6A is inputted at predetermined intervals with the degree of meandering and downhill of a road on which a vehicle is running (meandering downhill degree) Z, a speed V of the vehicle, an average throttle operation amount $\phi$ for a period from n second before till now, said amount being equivalent to the history of latest throttle openings, a current speed range n and a braked deceleration $\eta$. Based on these values, the meandering downhill road downshift determining means 6A determines whether or not a downshift should be performed. In this embodiment, however, thresholds $Z_0$, $V_0$, $\phi_0$, $n_0$ and $\eta_0$ are set with respect to these values Z, V, $\phi$, n and $\eta$. The values Z, V, $\phi$, n and $\eta$ are compared with these thresholds $Z_0$, $V_0$, $\phi_0$, $n_0$ and $\eta_0$, respectively, whereby it is determined whether or not the downshift should be performed.

With reference to the flow chart of FIG. 7, a description will now be made of details of shift control which is performed at prescribed parts in ECU 6, such as the meandering downhill road downshift determining means 6A and the downshift signal output means 6B.

First, in step S200, various information such as a vehicle speed V, throttle openings $\theta_{th}$, a current speed range n and the "ON/OFF" state of the brake switch are fetched, and are stored as needed. It is then determined in step S210 whether or not the vehicle speed V is greater than the threshold $V_0$. If the vehicle speed V is greater than the threshold $V_0$, the routine then advances to step S220, where as described above, an average throttle operation amount $\phi$ is calculated from the data of the throttle openings $\theta_{th}$ from n seconds before till now.

It is next determined in step S230 whether or not the average throttle operation amount $\phi$ is smaller than the threshold $\phi_0$. If the average throttle operation amount $\phi$ is smaller than the threshold $\phi_0$, the routine advances to step S240, where it is determined whether or not the speed range n is greater than the threshold $n_0$ (for example, $n_0 = 2$).

If the speed range n is greater than the threshold $n_0$, the routine then advances to step S250, where as described above, the individual data of the vehicle speed V and throttle openings $\theta_{th}$ are processed and the meandering downhill degree Z of the running road is calculated by fuzzy inference. It is next determined in step S260 whether or not the meandering downhill degree Z is greater than the threshold $Z_0$. If the meandering downhill degree Z is greater than the threshold $Z_0$, the routine then advances to step S270, where it is determined whether or not the brake switch is "ON".

If the brake switch is "ON", the routine next advances to step S280, where the braked deceleration $\eta$ is calculated from the information on the ON/OFF state of the brake switch and the vehicle speed V as described above. In step S290, it is next determined whether the braked deceleration $\eta$ is greater than the threshold $\eta_0$. If the braked deceleration $\eta$ is greater than the threshold $\eta_0$, the routine then advances to step S300 so that a command signal is outputted to downshift the transmission to a speed range (n−1) lower by one range than the current speed range n.

On the other hand, no downshift command is made if the results of determination in each of steps S210, S230, S240, S260, S270 and S290 are "NO".

By adequately setting the individual thresholds, downshift control can still be performed similarly to the first embodiment without relying upon fuzzy control so that substantially the same advantageous effects can be obtained. As in the first embodiment, the second embodiment can also be provided, for example, immediately before the downshift commanding step with a step to determine whether or not a downshift command is feasible. Based on this determination, the downshift command can be determined.

What is claimed is:

1. A shift control system for a vehicle automatic transmission in which a desired gear ratio is achieved in accordance with a driving state of a vehicle, comprising:

first detecting means for detecting a change in acceleration of said vehicle in a longitudinal direction thereof;

second detecting means for detecting a degree of meandering of a road on which said vehicle is running based on said detected change in acceleration;

third detecting means for detecting a downhill grade of said road;

first determining means for determining whether said road is a meandering downhill road, based on said degree of meandering detected by said second detecting means and said downhill grade detected by said third detecting means;

second determining means for determining whether a downshift is needed, when said road has been determined to be said meandering downhill road by said first determining means; and means for shifting said gear ratio of said vehicle automatic transmission from a current gear ratio to a gear ratio lower than said current gear ratio based on said determination by said second determining means.

2. A shift control system according to claim 1, wherein, said first determining means determines whether said road is said meandering downhill road by fuzzy inference using said degree of meandering and said downhill grade as input variables.

3. A shift control system according to claim 1, further comprising:

engine load detecting means for detecting an engine load on an engine mounted on said vehicle; and wherein said third detecting means detects said downhill grade on the basis of said engine load detected by said engine load detecting means.

4. A shift control system according to claim 3, further comprising:

average value determining means for obtaining an average value of said engine load;

wherein said first determining means determines whether said road is said meandering downhill road, based on said average value of said engine load detected by said average value determining means during a first predetermined time period preceding said determination by said first determining means, and said detected change in acceleration detected by said first detecting means during a second predetermined time period preceding said determination by said first determining means.

5. A shift control system according to claim 4, wherein said first determining means determines said road as a meandering downhill road when said average value of said load is small and said amount of said detected change in acceleration is large.

6. A shift control system according to claim 1, further comprising:

deceleration detecting means for detecting a deceleration of said vehicle; add wherein said second determining means determines whether said downshift is necessary based on said deceleration detected by said deceleration detecting means, when said road is determined to be said meandering downhill road by said first determining means.

7. A shift control system according to claim 6, further comprising:

braking operation detecting means for detecting a braking operation of said vehicle;

wherein said deceleration detecting means detects said deceleration of said vehicle upon detection of said braking operation by said braking operation detecting means, and said downshift determining means determines whether said downshift is needed based on said deceleration during said braking operation when said road is determined as said meandering downhill road by said first determining means.

8. A shift control system according to claim 6, wherein said first determining means determines a degree of meandering downhill of said road, and said second determining means determines whether said downshift is needed, by fuzzy inference using said degree of meandering downhill and said deceleration as input variables.

9. A shift control system according to claim 6, wherein said second determining means determines that said downshift is needed when a degree of meandering downhill determined by said first determining means and said deceleration detected by said deceleration detecting means are both large.

10. A shift control system according to claim 6, further comprising:

engine load detecting means for detecting an engine load of an engine mounted on said vehicle;

average value determining means for determining an average value of said engine load;

wherein said third detecting means detects said downhill grade on the basis of said engine load detected by said engine load detecting means, and said second determining means determines whether said downshift is needed, based on said average value of said engine load during a third predetermined time period immediately before said determination by said second determining means.

11. A shift control system according to claim 10, wherein said second determining means determines that said downshift is needed when a degree of said meandering downhill determined by said first determining means and said deceleration detected by said deceleration detecting means are both large and said average value of said engine load is small.

12. A shift control method for a vehicle automatic transmission in which a desired gear ratio is achieved in accordance with a driving state of a vehicle, comprising:

(a) detecting a change in acceleration of said vehicle in a longitudinal direction thereof;

(b) detecting a degree of meandering of a road on which said vehicle is running based on said detected change in acceleration;

(c) detecting a downhill grade of said road;

(d) determining whether said road is a meandering downhill road, based on said degree of meandering detected in said step (b) and said downhill grade detected in said step (c);

(e) determining whether a downshift is needed, when said road has been determined to be said meandering downhill road in said step (d); and (f) shifting said gear ratio of said vehicle automatic transmission from a current gear ratio to a gear ratio lower than said current gear ratio based on said determination said step (e).

13. A shift control method according to claim 12, wherein, said step (d) determines whether said road is said meandering downhill road by fuzzy inference using said degree of meandering and said downhill grade as input variables.

14. A shift control method according to claim 12, further comprising:

(g) detecting an engine load of an engine mounted on said vehicle;

wherein said step (c) detects said downhill grade on the basis of said engine load.

15. A shift control method according to claim 14, further comprising:

(h) obtaining an average value of said engine load;

wherein said step (d) determines whether said road is said meandering downhill road, based on said average value of said engine load detected during a first predetermined time period preceding said determination in said step (d), and an amount of said change in acceleration detected in said step (b) during a second predetermined time period preceding said determination in said step (d).

16. A shift control method according to claim 15, wherein said step (d) determines said road as said meandering downhill road when said average value of said engine load is small and said change in acceleration is large.

17. A shift control method according to claim 12, further comprising:

(g) detecting a deceleration of said vehicle; and wherein said step (e) determines whether said downshift is needed based on output of said step (g) when said road is determined as said meandering downhill road in said step (d).

18. A shift control method according to claim 17, further comprising:

(h) detecting a braking operation of said vehicle; and wherein said step (g) detects said deceleration of said vehicle upon detection of said braking operation; and said step (e) determines whether said downshift is needed based on said deceleration detected in said step (g) during said braking operation when said road has been determined as said meandering downhill road in said step (d).

19. A shift control method according to claim 17, wherein said step (d) determines a degree of meandering downhill of said road; and said step (e) determines whether a downshift is needed by fuzzy inference using said degree of meandering downhill and said deceleration as input variables.

20. A shift control method according to claim 17, wherein said step (e) determines that said downshift is needed, when a degree of meandering downhill determined in said step (d) and said deceleration detected in said step (g) are both large.

21. A shift control method according to claim 17, further comprising:

(h) detecting an engine load of an engine mounted on said vehicle;

wherein said step (c) detects said downhill grade on the basis of said engine load detected in said step (h), and said step (e) determines whether said downshift is needed, based on an average value of engine load detected during a third predetermined time period immediately before said determination in said step (e).

22. A shift control method according to claim 21, wherein said step (e) determines that said downshift is needed, when a degree of said meandering downhill determined in said step (d) and said deceleration detected in said step (g) are both large and said average value of said engine load is small.

23. A shift control system for a vehicle automatic transmission in which a desired gear ratio is achieved in accordance with a driving state of a vehicle, comprising:

first detecting means for detecting a degree of meandering of a road on which said vehicle is running;

second detecting means for detecting a downhill grade of said running road;

third detecting means for detecting a deceleration of said vehicle during a braking operation;

first determining means for determining whether said road is a meandering downhill road based on said detected degree of meandering and said detected downhill grade;

second determining means for determining whether a downshift is needed based on said determination by said first determining means and said deceleration detected by said third detecting means; and shifting means for shifting said gear ratio of said automatic transmission from a current gear ratio to a gear ratio lower than said current gear ratio based on said determination by said second determining means.

24. A shift control system of claim 23, wherein said third detecting means comprises:

braking operation detecting means for detecting said braking operation of said vehicle.

25. A shift control method for a vehicle automatic transmission in which a desired gear ratio is achieved in accordance with a driving state of a vehicle, comprising:

(a) detecting a degree of meandering of a road on which said vehicle is running;

(b) detecting a downhill grade of said running road;

(c) detecting a deceleration of said vehicle during a braking operation;

(d) determining whether said road is a meandering downhill road based on said detected degree of meandering and said detected downhill grade;

(e) determining whether a downshift is needed based on said determination in said step (d) add said detected deceleration of said vehicle; and (f) shifting said gear ratio of said automatic transmission from a current gear ratio to a gear ratio lower than said current gear ratio based on said determination in said step (e).

26. The shift control method of claim 25, wherein said step (c) includes the substep of, (ca) detecting a braking operation of said vehicle.

* * * * *